United States Patent [19]

Beppu et al.

[11] 4,392,733
[45] Jul. 12, 1983

[54] INTERVALS TIMER FOR CAMERAS

[75] Inventors: Norio Beppu, Sennan; Akira Fujii, Osaka, both of Japan

[73] Assignee: Minolta Camera Kabushiki Kaisha, Osaka, Japan

[21] Appl. No.: 279,950

[22] Filed: Jul. 2, 1981

[30] Foreign Application Priority Data

Aug. 7, 1980 [JP] Japan ................................. 55-93752
Aug. 7, 1980 [JP] Japan ................................. 55-93753

[51] Int. Cl.³ ...................... G03B 17/38; G03B 17/18; H03K 1/153
[52] U.S. Cl. .................................... 354/266; 354/289; 307/600; 328/73; 328/129.1
[58] Field of Search ............... 354/171, 173, 234, 235, 354/238, 289, 266–268; 352/121, 137, 169, 178; 307/141, 141.4, 132 E, 592, 597, 600, 602, 603; 328/73, 129

[56] References Cited

U.S. PATENT DOCUMENTS 4,054,888 10/1977 Kozuki et al. ................ 354/173 X
4,086,603 4/1978 Kozuki et al. ................ 354/173 X

FOREIGN PATENT DOCUMENTS

52-106719 9/1977 Japan .

Primary Examiner—William B. Perkey
Attorney, Agent, or Firm—Watson, Cole, Grindle & Watson

[57] ABSTRACT

An interval timer periodically provides a release signal output to a camera for controlling photographic operation by carrying out one exposure cycle and a successive automatic film winding operation. The interval timer provides circuitry for setting the interval between the occurrence of the successive release signals and includes first and second terminals adapted to be connected with the camera, the release signal being transmitted to the camera through the first terminal. Circuitry within the interval timer is responsive to a first reply signal transmitted from the camera at the second terminal for examining the time of the arrival of the first reply signal at the second termial to determine whether or not the time falls into a predetermined condition for controlling the operation of the interval timer circuitry for periodically producing the release signal.

7 Claims, 4 Drawing Figures

INTERVALS TIMER FOR CAMERAS

BACKGROUND OF THE INVENTION

1. Field of the Invention

The present invention generally relates to interval timer devices for cameras adapted to operate with an automatic film winder, and more particularly to such interval timer devices for periodically providing the camera with a release signal so that the camera periodically carries out one cycle of an exposure and an automatic film winding operation in response to each camera release signal until the total number of the actual exposures reaches a desired number preset in the interval timer.

2. Description of the Prior Art

A conventional interval timer is generally designed to produce a preset number of release signals at predetermined intervals. The production of the release signal is continued until a once determined end even if further photography is really made impossible due to some reason, e.g., a situation involving the impossibility of further film winding by the automatic film winder because the film has been wound up to the last frame prior to the count-up of the number of frames preset in the interval timer by mistake.

SUMMARY OF THE INVENTION

An object of the present invention is to provide an interval timer which can stop providing release signals when detecting that the camera is really unable to carry out further exposure.

Another object of the present invention is to provide an interval timer which warns upon detecting that the camera does not really carry out exposures at intervals determined by the interval timer.

Still another object of the present invention is to provide an interval timer which can produce release signals at intervals during which the camera can really carry out photographic exposures if the originally set interval is too short for the camera to actually follow.

According to the present invention, there is no necessity of modifying the camera to have a specially designed means for detecting an abnormal condition that the camera is incapable of carrying out exposures at intervals produced by the interval timer to generate a signal indicative of the abnormal condition. A conventional switch or like-functioning component, to be actuated in synchronism with the timing of one of a series of camera operations, is utilized to generate a reply signal. The reply signal is transmitted to the interval timer, which determines whether the timing of arrival of the reply signal is correct or not. Thus, the absnormal condition of the camera is detected by determining the timing of arrival of the reply signal to the interval timer.

BRIEF DESCRIPTION OF THE DRAWINGS

The above objects, features and advantages of the invention are apparent from the following description of preferred embodiments of the best mode of carrying out the invention when taken in conjunction with the accompanying drawings, wherein.

DETAILED DESCRIPTION OF THE PREFERRED EMBODIMENTS

Figure 1:
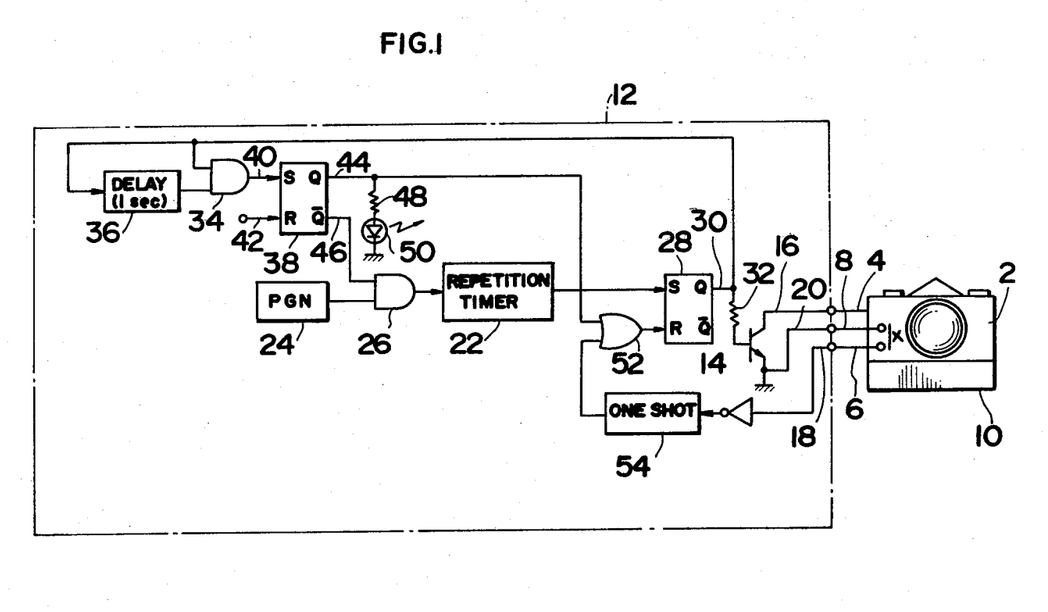
FIG. 1 represents a circuit diagram of an exemplary general embodiment of the present invention.

FIG. 1 is a circuit diagram of a first embodiment of the present invention, illustrating the principal structural concept thereof. In order to simply illustrate the function of preventing operation of interval timer 12 in the case where synchro switch X is not closed within a predetermined period of time after transistor 14 has been conductive upon release of the shutter, components which do not directly pertain to such a preventing function are not shown in FIG. 1.

In FIG. 1, camera 2 has terminal 4 for receipt of a release command signal and terminal 6 connected to synchro switch X for flash photography. Camera 2 is also adapted to be provided with film winder unit 10 which automatically winds up film upon completion of exposure. Synchro switch X is adapted to only close for a short period of time in response to the opening movement of the shutter upon release thereof. If the two terminals 4 and 8 are short-circuited, then a well known electromagnetic release assembly incorporated in camera 2 will start release operation. With output transistor 14, included in the interval timer 12, becoming conductive the shutter release command signal is developed. The situation wherein transistor 14 is conductive is hereafter considered in the specification as that in which the release command signal is generated. Interval timer 12 has terminals 16 and 18 each connected to release command terminal 4 and synchro switch terminal 6, respectively.

Repetition timer 22 is adapted to count pulses applied thereto via AND gate 26 from pulse generator 24 and generates a pulse for placing RS flip-flop 28 into a set condition each time a predetermined number of the pulses are counted. This procedure is repeated as long as AND gate 26 is unblocked. Repetition timer 22 may be implemented with a pulse counter, a coincidence circuit for generating a signal when the count of the pulse counter is in coincidence with an operator setting, and a clear circuit for clearing the counter in response to the output signal of the coincidence circuit. An alternative construction of repetition timer 22 is the use of a presettable counter. The structure and operation of these components are well known to the camera circuit designer and need not be described for the purpose of carrying out the invention. The interval for the photographing procedure corresponds to the time necessary for repetition timer 22 to reach the setting of the number of the pulses. Q output 30 of flip-flop 28 is connected to one terminal of resistor 32 and to an input of AND gate 34 and an input of delay circuit 36, the remaining terminal of resistor 32 being connected to the base of transistor 14. When the input voltage of delay circuit 36 is inverted from "low" to "high", the output voltage thereof is transformed from "low" to "high" in a given period of time, for example, one second. However, if the input voltage of delay circuit 36 is inverted from "high" to "low", then the output voltage thereof immediately changes from "high" to "low". The output of delay circuit 36 is connected to the other input of AND gate 34. Accordingly, in the case in which the voltage level of Q output 30 of flip-flop 28 changes from "low" to "high" and then remains "high" for the one second delay duration, the output of AND gate 34 changes to a "high" level. However, in the case in which Q output 30 returns to a "low" level within one second, the output of AND gate 34 remains at a "low" level. The output of AND gate 34 is connected to set input 40 of RS flip-flop 38. Q and $\overline{Q}$ outputs 44 and 46 of flip-flop 38 are respectively connected to one input of OR gate 52 and one input of AND gate 26. The remaining input to OR gate 52 is connected to the output of one-shot circuit 54, the input of which is connected to a signal source of camera 2 via terminal 18. Q output 44 of flip-flop 38 is also connected to light emitting diode 50 through resistor 48. It is noted that light emitting diode 50 is fired when wind-up of the film is interrupted, as will be described below.

The above described circuit operates in the following manner. Assume now that flip-flop 38 is in reset position with the Q output thereof providing a "high" voltage signal. AND gate 26 transfers the pulses from pulse generator 24 and repetition timer 22 is in a counting mode, in which case flip-flop 28 is in a reset condition with the Q output thereof at a "low" level. It is further assumed that camera 2 is ready for photographing. Should repetition timer 22 count the predetermined number of pulses and provide a set pulse output, flip-flop 28 will be forced into a set condition. This results in making transistor 14 conductive for release operation of camera 2 and placing delay circuit 36 into operation. For example, 100 msec after transistor 14 has been made conductive, synchro switch X is closed in association with the operation of an exposure mechanism. In response to that closing movement, one-shot circuit 54 provides a reset pulse which resets flip-flop 28. The result is that Q output 30 of flip-flop 28 changes to a "low" level to make transistor 14 nonconductive and unlatch delay circuit 36 from the delay operation thereof. The output of AND gate 34 therefore remains at a "low" level. In other words, when the shutter is exactly released in response to the output of repetition timer 22, flip-flop 28 is placed into a reset condition within the delay time of delay circuit 36 to allow another cycle of operation. Repetition timer 22 commences a new counting operation upon receipt of the pulses from pulse generator 24.

On camera 2 winder 10 achieves wind-up of the film upon completion of an exposure. If wind-up of the film is impossible and the shutter is not charged for any reason, then the shutter is neither released nor is synchro switch X closed even though flip-flop 28 is brought into a set condition in response to the output signal from repetition timer 22 and the release command signal is supplied to camera 2. As a result, one-shot circuit 54 remains in a non-operative condition and flip-flop 28 remains in a set condition. One second later, delay circuit 36 provides a "high" level voltage to place flip-flop 38 into a set condition in which Q output 44 thereof is "high" and the $\overline{Q}$ output is "low". In this instance, a "low" voltage from the $\overline{Q}$ output blocks AND gate 26 and interrupts the counting operation of repetition timer 22, whereas a "high" voltage from Q output 44 fires light emitting diode 50, and places flip-flop 28 into a reset condition to make transistor 14 nonconductive. The above procedure senses and indicates, when the camera is given the release command signal, that it is impossible to achieve wind-up of the film, as well as preventing further issuance of the release command signal.

Figure 2:
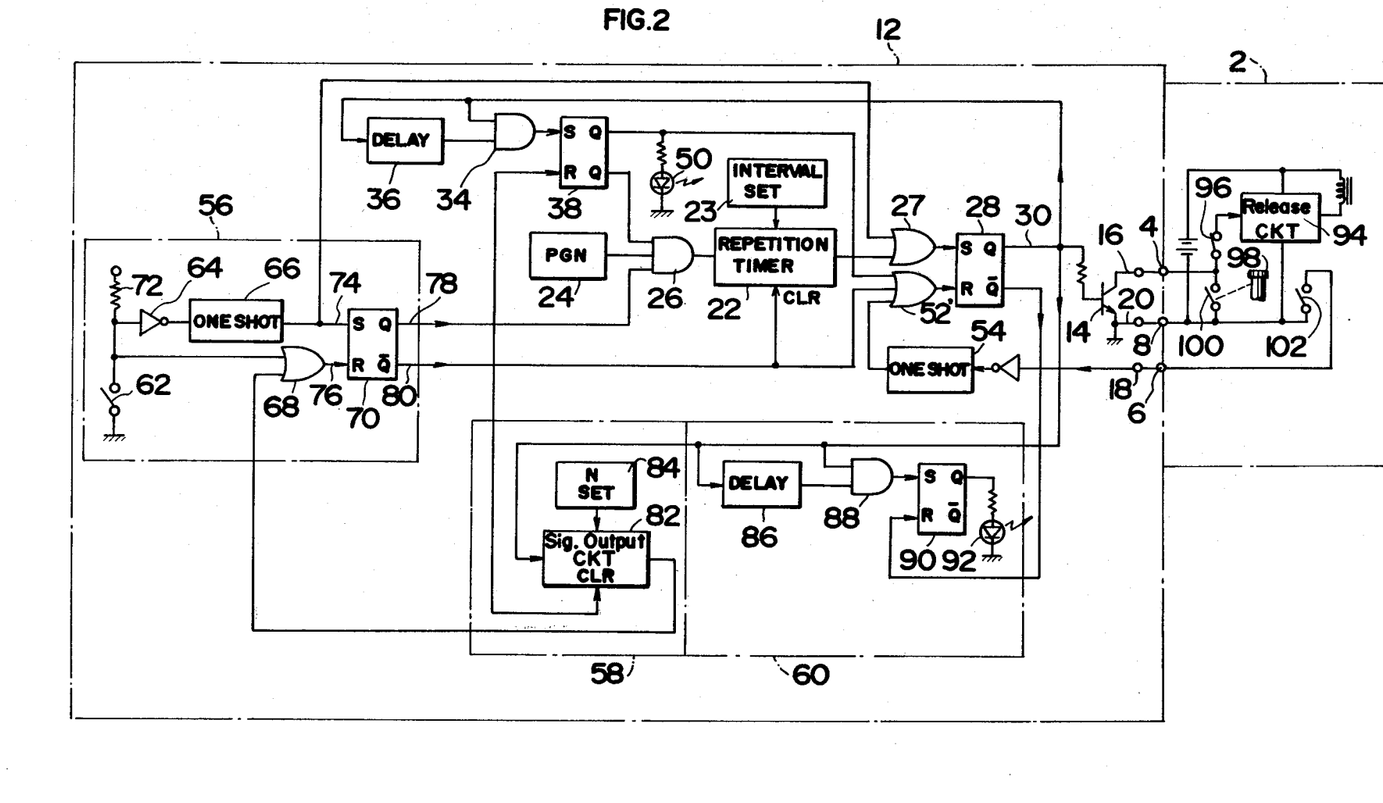
FIG. 2 represents a circuit diagram of a modification of the embodiment of FIG. 1.

The following description of the circuit of a preferred embodiment of the invention shown in FIG. 2 denotes circuit components similar to those in FIG. 1 by the same reference numbers. The circuit in FIG. 2 comprises, in addition to that in FIG. 1, a wake-up circuit 56 for starting operation of the entire circuit, a photographing frame number control circuit 58 for controlling the number of the release command signals depending upon manual camera settings, and display circuit 60 for sensing and indicating that the exposure time determined by an automatic exposure time control device (not shown), depending upon variations in the brightness of an object during photographing, is longer than an interval setting. With such an addition, AND gate 26 and OR gate 52 of FIG. 1 are altered into three-input AND gate 26' and three-input OR gate 52'. There is also provided OR gate 27, through which the outputs of repetition timer 22 and wake-up circuit 56 are input to flip-flop 28.

Camera 2 is equipped with a well-known automatic exposure device 94 which comprises an electromagnetic release unit operable upon closure of release switch 100 operatively interlocked with depression of shutter button 98 under the condition where switch 96 is closed. Switch 96 is placed into open position in response to shutter release operation and into closed position upon completion of film wind-up. Switch 96 is in open position during exposure so that the electromagnetic release unit may be prevented from operating even though release switch 100 in inadvertently closed. Switch 102 provides a timing signal for actuating the synchro switch or superimposing data. It is noted that switch 102 need only operate in response to shutter release operation and, for example, it may be a switch for governing automatic wind-up operation and shifting into open position upon completion of exposure, and into closed position upon completion of film wind-up.

Wake-up circuit 56 includes switch 62, inverter 64, one-shot circuit 66, OR gate 68 and RS flip-flop 70. Switch 62 in closed position begins operation of interval timer 12. When switch 62 is open, a "high" voltage is applied to an input of OR gate 68 through resistor 72. Under these circumstances flip-flop 70 is in a reset condition while receiving at reset input 76 thereof a "high" voltage from OR gate 68, thus providing respective "low" and "high" voltages at Q output 78 and $\overline{Q}$ output 80 thereof. The "high" voltage from $\overline{Q}$ output 80 clears repetition timer 22 and a pulse counter included in signal output circuit 82, and also resets flip-flops 28 and 38. The "low" voltage from Q output 78, however, blocks AND gate 26'. To start operation of the interval timer, switch 62 is closed so that the output level of inverter 64 changes from a "low" to a "high" voltage, whereupon one-shot circuit 66 develops a pulse to place flip-flops 70 and 28 into a set condition. Consequently, the first release command signal is developed in response to the output signal of one-shot circuit 66 rather than the output signal of repetition timer 22. With flip-flop 70 in a set condition, however, AND gate 26' is unblocked, which permits repetition timer 22 to begin counting the pulses from pulse generator 24.

The above-described procedure completes initiation of operation of the interval timer with the operation of wake-up circuit 56. Upon completion of photographing of a predetermined number of frames, frame number control circuit 58 develops a pulse which is then applied to flip-flop 70 via OR gate 68 to place flip-flop 70 into a reset condition. This results in inhibiting a further release command from being generated.

Frame number control circuit 58 is of a circuit design similar to that of repetition timer 22, and signal output circuit 82 includes a pulse counter and a coincidence circuit, the input of the pulse counter being connected to the Q output of flip-flop 28. Frame number setting circuit 84 provides a binary representation of a frame number manually set by the camera operator. The coincidence circuit determines if the count of the pulse counter agrees with the binary representation and, if so, provides a "high" voltage for OR gate 68.

Indicator circuit 60 comprises delay circuit 86, AND gate 88, RS flip-flop 90 and light emitting diode 92. Delay circuit 86 begins operating when the voltage level of Q output 30 of flip-flop 28 changes from "low" to "high", and then provides a "high" level voltage after a given interval of time. In the case in which synchro switch X is in use, the delay time of delay circuit 86 is selected to be somewhat longer than the time ranging from the beginning of camera release operation to closure of synchro switch X.

Furthermore, in the case in which a switch other than synchro switch X, for example, a switch providing a timing signal for introduction of the date of photographing onto the film, is used, the delay time is selected to be somewhat longer than the time from the beginning of release operation to actuation of that switch. Such selection allows flip-flop 90 to be placed into a set condition to fire light emitting diode 92 in response to the output of AND gate 88 after the development of the second release command signal, provided that the sum of exposure time and the time required for film wind-up is longer than the interval setting. This may be true when a relatively short interval (say, 0.5 sec) is preset. In other words, in the case wherein the camera is equipped with automatic exposure control and the brightness of an object is low, the time for photographing may extend 0.5 sec or more. In this instance, when the second release command signal is provided after the interval setting, 0.5 sec after the development of the first release command signal, the camera is in an exposure cycle responsive to the first release command signal with no reply to the second release command signal. Flip-flop 28 is therefore maintained in a set condition. If flip-flop 28 is maintained in this condition for the delay time of delay circuit 86, then flip-flop 90 is set and light emitting diode 92 is fired. An audible alarm may be provided with either light emitting diode 92 or 50 actuated.

Figure 3:
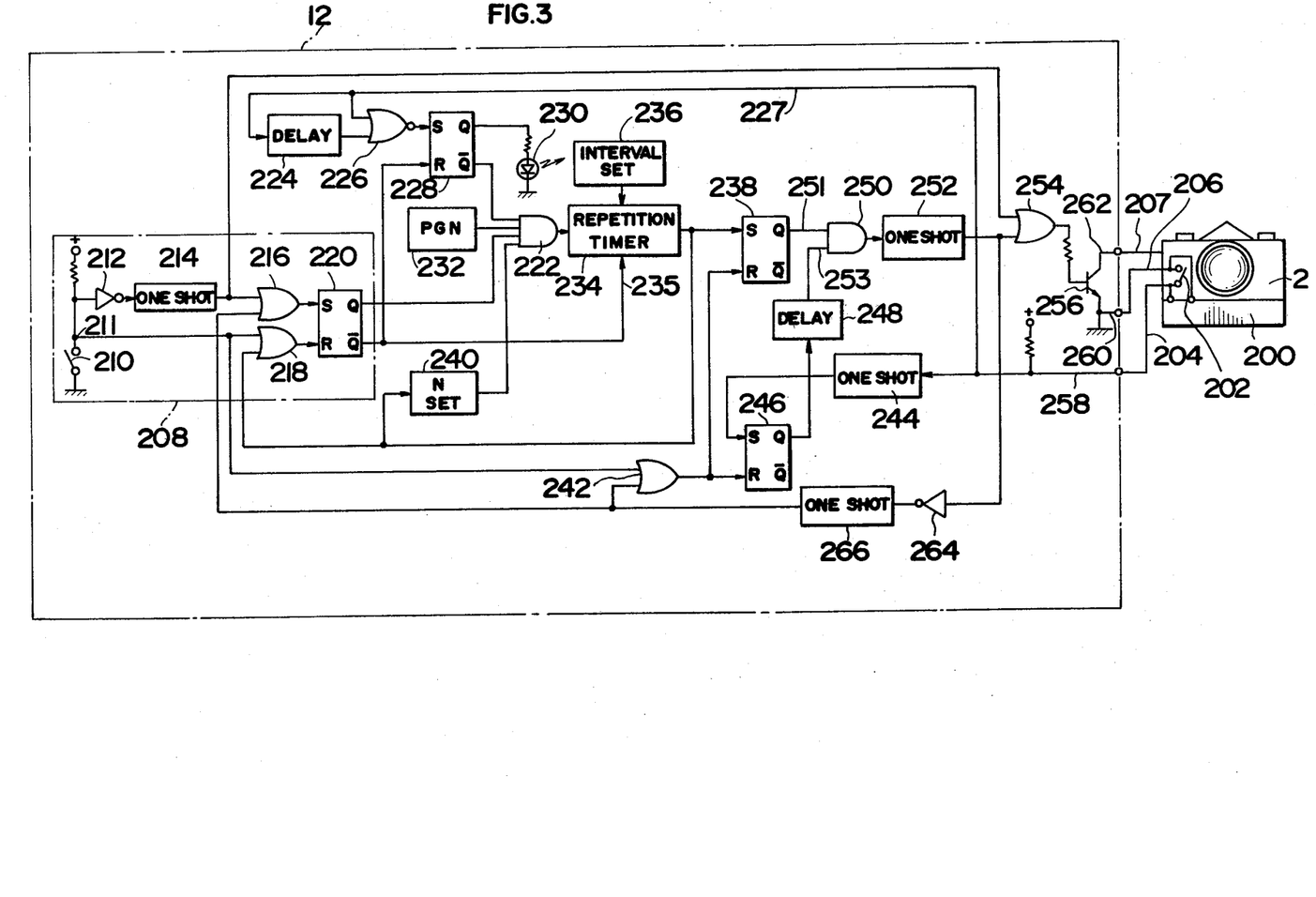
FIG. 3 represents a circuit diagram of another preferred embodiment of the present invention.

A second embodiment of the present invention is illustrated in the circuit diagram of FIG. 3, which embodiment is applicable to a camera having switch 202 connected to external terminals 204 and 206 leading to an interval timer for controlling automatic winder 200. Switch 202 is adapted to move into closed position upon completion of travel of the trailing shutter curtain of camera 2, and into open position shortly before the completion of shutter charging with film wind-up. Automatic winder 200 begins winding up the film upon closure of switch 202 and ends winding after the film has been wound a desired length. As a general rule, it takes about 0.1 sec for the automatic winder to complete wind-up of one frame of the film. The circuit of FIG. 3 is adapted to regard the situation where switch 202 is not closed even after the passage of such a wind-up time as a situation where it is impossible to wind-up the film, and therefore prevents the interval timer from developing the release command signal. Should the exposure cycle, that is, the sum of the exposure time and the time for film wind-up be longer than an interval setting, the exposure cycle would correspond to the interval for repetitive photographing.

Interval timer wake-up circuit 208 includes start switch 210, inverter 212, one-shot ciruit 214, OR gate 216 and RS flip-flop 220. The Q output of RS flip-flop 220 is connected to one of the inputs to AND gate 222 with the $\overline{Q}$ output connected to a reset input of RS flip-flop 228 and preset input 235 of repetition timer 234. Repetition timer 234 comprises a presettable counter and a one-shot circuit for generating a pulse in response to a signal from the counter when it counts a preset number of pulses. Repetition timer 234, when being supplied at preset input 235 with a "high" voltage, is loaded with a binary representation of the interval setting via interval set encoder 236. Repetition timer 234 is ready to count upon application of a "low" voltage at input 235 thereof. The output of repetition timer 234 is connected to the input of frame number control circuit 240 and an input to OR gate 218. Frame number control circuit 240 may comprise an encoder designed for providing a binary signal indicative of a frame number setting, for example, and a presettable counter. When the frame number setting is reached, a "low" voltage is supplied to one of the inputs to AND gate 222, inhibiting repetition timer 234 from counting the pulses. While an output pulse from repetition timer 234 is of use in setting flip-flop 238, a "high" voltage is supplied from AND gate 250 to permit one-shot circuit 252 to provide a pulse as long as flip-flop 246 is in a set condition. The pulse from one-shot circuit 252 is applied via OR gate 254 to transistor 256 to make the transistor conductive and supply the release command signal to the camera.

In the event that switch 202 is not returned to an open position after the passage of the film wind-up time after it has been closed upon completion of exposure, delay circuit 224, combined with NOR gate 226, senses this situation. With transition of the input voltage thereof from "high" to "low", the output voltage of delay circuit 224 inverts from "high" to "low" with a time delay longer than the film wind-up time. When receiving "low" voltage at both inputs, NOR gate 226 provides a "high" output voltage. The input of delay circuit 224 and one of the inputs of NOR gate 226 are led via conductor 227 and terminal 258 to switch 202 on the camera side. When switch 202 is in open position, or when the camera is not in a film wind-up mode, conductor 227 provides "high" voltage. However, when switch 202 is closed in response to film wind-up operation, conductor 227 provides "low" voltage. If the period of time where the conductor provides "low" voltage is longer than the delay time of delay circuit 224, the two inputs to NOR gate 226 are supplied with "low" voltage after the passage of the delay time. Under that circumstance, the output of NOR gate 226 places into a set condition filp-flop 228, the Q output thereof then provides "low" voltage to close AND gate 222 and inhibits repetition timer 234 from counting. However, provided that the period of time when switch 202 is in closed position does not exceed the delay time, NOR gate 226 is neither supplied at both inputs thereof with "low" voltage, nor does it provide "high" voltage to bring flip-flop 228 into a set condition.

One-shot circuit 244 has the input thereof connected to terminal 258 so that it may provide a pulse to place RS flip-flop 246 into a set condition when switch 202 is open and the voltage level at terminal 258 changes from "low" to "high". Flip-flops 238 and 246 are reset in response to "high" voltage supplied from one-shot circuit 266 via OR gate 242. One of the inputs to OR gate 242 is connected to one terminal of start switch 210. The output of one-shot circuit 266 is also connected to one of the inputs to OR gate 216.

The following description sets forth in operation of the circuit of FIG. 3. It is assumed that shutter charging has been completed in the camera. It is further assumed that a desired interval for photographing and a desired number of frames have been preset by the camera operator by mechanism well known to the camera art. While the circuit is supplied with power, the following description proceeds with the condition where operation for repetitive photography is in the standby state. Start switch 210 is in open position and node 211 is at a "high" voltage level which causes flip-flops 220, 228, 238 and 246 to be in a reset condition. To start the photographing procedure, start switch 210 is actuated into closed position to permit one-shot circuit 214 to develop a pulse. This pulse is applied via OR gate 254 to transistor 256 to make it conductive so that the camera is given the release command signal and flip-flop 220 is placed into a set condition. AND gate 222 transmits pulses from pulse generator 232 and repetition timer 234 begins to count those pulses.

Switch 202 on the camera side is temporarily closed while the film is being wound up by automatic winder 200 after completion of the exposure operation caused by the release command signal. Shortly before completion of film wind-up, switch 202 is placed into open position, whereupon one-shot circuit 244 provides a pulse to set flip-flop 246 with the resultant transition of the Q output thereof from "low" to "high". The "high" voltage is delayed by a fixed period of time through delay circuit 248 and then applied to one of the inputs to AND gate 250. The fact that AND gate 250 has a "high" voltage at the input thereof means that winding-up of the film has been completed. The interval setting is generally sufficiently longer than the exposure time of the camera, in which case flip-flop 246 is placed into a set condition by one-shot circuit 244 before flip-flop 238 is placed into a set condition by the output signal from repetition timer 234. For repetitive photography, input 253 of AND gate 250 is thus supplied with "high" voltage prior to the passage of the interval which has been set. After the interval has passed, repetition timer 234 delivers a pulse to set flip-flop 238, permitting AND gate 250 to gate "high" voltage and one-shot circuit 252 to provide a pulse output which releases the camera again.

The pulse from repetition timer 234 is further applied via OR gate 218 to a reset input of flip-flop 200 to bring it into a reset condition. With flip-flop 220 in a reset condition, repetition timer 234 is preset by interval set encoder 236 and ready for the next pulse counting. At this time AND gate 222 is blocked. In response to the trailing edge of the pulse from one-shot circuit 252 for providing the camera with the release command signal, one-shot circuit 266 develops a pulse to place flip-flops 238 and 246 into a reset condition and flip-flop 220 into a set condition. Flip-flop 220 in a set condition unblocks AND gate 222 and permits pulse counting by repetition timer 234. The above procedure is repeated until frame number control circuit 240 counts up to the preset frame number and develops a "low" voltage output in response thereto.

Provided that the film has become exhausted completely up to the last available frame such that any further wind-up is impossible before frame number control circuit 240 counts up to the preset frame number, switch 202 remains closed and conductor 227 conducts a "low" voltage. As a result, the two inputs of NOR gate 226 are supplied with "low" voltage with the resultant development of "high" voltage at the output of NOR gate 226, which in turn places flip-flop 228 into a set condition. AND gate 222 is accordingly placed into a blocked condition so that repetition timer 234 ceases pulse counting. Additionally, light emitting diode 230 indicates such a disabled condition in response to "high" voltage and the Q output of flip-flop 228.

The above circuit operates in the following manner when the interval setting (e.g., 0.5 sec) is shorter than the exposure cycle (e.g., 1 sec), that is, the sum of the exposure time and the film wind-up time. Upon closure of start switch 210 the release command signal is provided in connection with the first frame. If repetition timer 234 develops a pulse output with the passage of the set interval, then that pulse places flip-flop 238 into a set condition and flip-flop 220 into a reset condition. At this moment the exposure cycle is still in progress and flip-flop 246 is in a reset condition. The pulse output from repetition timer 234 is accordingly prevented from gating through AND gate 250 and no release command signal is issued in response thereto. Because flip-flop 220 is in a reset condition, AND gate 222 is maintained in a blocked condition and repetition timer 234 is in a preset state without counting pulses. When the exposure cycle is terminated under the above circumstances, one-shot circuit 244 becomes operative to provide an output, placing flip-flop 246 into a set condition. "High" voltage from the Q output of flip-flop 246 is accordingly supplied to input 253 of AND gate 250 through delay circuit 248. Since input 251 of AND gate 250 is already supplied with "high" voltage, the output of AND gate 250 is "high" when the output of the delay circuit 248 increases to a "high" level. One-shot circuit 252 becomes operative in response to the output of AND gate 250, providing the release command signal for the camera, and then placing flip-flops 238 and 246 into a reset condition and flip-flop 220 into a set condition. In this manner, AND gate 222 is blocked and repetition timer 234 restarts pulse counting. In the case in which the exposure cycle is longer than the interval setting, the photographing procedure is repeatedly performed based upon the exposure cycle.

Figure 4:
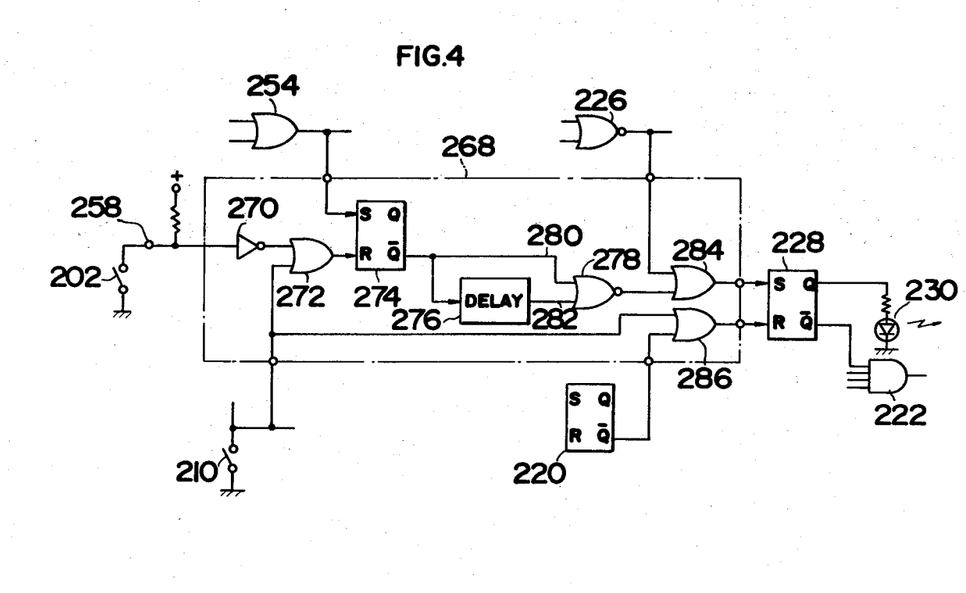
FIG. 4 represents a circuit diagram of a pertinent portion of a modification of the embodiment of FIG. 3.

Interval timer termination or faulty condition detector circuit 268 in FIG. 4, defined by the chain line, terminates the operation of the interval timer in the event that switch 202 on the camera side in FIG. 3 cannot be closed upon the passage of a fixed period of time after the development of the release command signal. In this case the fixed period of time is selected to be slightly longer than the maximum possible camera exposure time, for example. With such selection, it is possible that the camera is in a faulty condition for any number of reasons.

In FIG. 4, components not included in camera faulty condition detector 268 which are similar to those in FIG. 3 are represented by the same reference numbers. A circuit means for determining if the given period of time has expired is implemented by delay circuit 276 and NOR gate 278, with similarity of operation to the above-illustrated circuit means shown as comprising delay circuit 224 and NOR gate 226 in FIG. 3, except for the length of the delay time. Flip-flop 274 is initially in a reset condition and placed into a set condition in response to a pulse from OR gate 254. Flip-flop 274 then provides from the $\overline{Q}$ output thereof a "low" voltage, which in turn is supplied to delay circuit 276 to initiate delay operation thereof. Supposing that the delay time of delay circuit 276 is, for example, 5 sec, the output of the delay circuit is maintained at a "high" voltage and NOR gate 278 provides a "low" voltage until the period of 5 sec has expired. If switch 202 is brought into a closed position upon completion of exposure, then the voltage level at terminal 258 becomes "low" so that inverter 270 provides "high" voltage for a reset input to flip-flop 274 via OR gate 272. Flip-flop 274 is therefore placed into a reset condition with the $\overline{Q}$ output thereof providing "high" voltage. In the case in which exposure is completed within the delay period of 5 sec after the development of the release command signal, two inputs 280 and 282 to NOR gate 278 are not supplied with "low" voltage at the same time so that NOR gate 278 does not deliver a "high" voltage. Flip-flop 228 is therefore never placed into a set condition by the output of NOR gate 278. Should switch 202 not be closed within the delay time of 5 sec, NOR gate 278 provides "high" voltage output in response to "low" voltage from the $\overline{Q}$ output of flip-flop 274 and "low" voltage from delay circuit 276, thus placing flip-flop 228 into a set condition. Flip-flop 228 in a set condition provides "low" voltage from the $\overline{Q}$ output thereof to unblock AND gate 222 and interrupt repetition timer 234 from counting pulses. Light emitting diode 230 is enabled to show that the camera is in a faulty condition.

As is clear from the foregoing description of preferred embodiments, the present invention utilizes an indispensable switch of the camera in order to find any faulty condition of the camera such as interrupted film wind-up and, if a faulty condition exists, terminates the operation of the interval timer to avoid malfunction of the camera.

It is obvious that the interval timer circuit embodying the present invention may be constructed as an independent interval timer unit attachable to the camera. As an alternative, the interval timer circuit embodying the present invention may be assembled into a back lid of the camera to be substituted for the conventional back lid.

It is, therefore, desired that the present invention not be limited to the embodiments specifically described, but that it include all such modifications and variations that would be obvious to those skilled in this art. The scope of our invention should be determined by the equivalents of the various terms as recited in the following annexed claims.

What is claimed is:

1. Interval timer for periodically providing a camera with a release signal to control the photographing operation thereof by carrying out one exposure cycle and a successive automatic film winding operation in response to each release signal from the interval timer, comprising:

means for periodically producing a release signal;
   means for setting the interval between the occurrence of the successive release signals;
   first and second terminals to be connected with the camera, the release signal being transmitted to the camera through said first terminal;
   means responsive to a first reply signal at said second terminal transmitted from the camera for examining the timing of the arrival of the first reply signal to said second terminal to determine whether or not the examined timing falls into a predetermined condition for controlling the operation of said means for producing, and including means for measuring a period from the transmission of the release signal to the arrival of the first reply signal; and
   means responsive to said examining means for interrupting said producing means from producing the release signal when the examined timing falls into the predetermined condition, said predetermined condition being that said measured period is longer than a predetermined time period.

2. Interval timer for periodically providing a camera with a release signal to control the photographing operation thereof by carrying out one exposure cycle and a successive automatic film winding operation in response to each release signal from the interval timer, comprising:

means for periodically producing a release signal;
   means for setting the interval between the occurrence of the successive release signals;
   first and second terminals to be connected with the camera, the release signal being transmitted to the camera through said first terminal;
   means responsive to a first reply signal at said second terminal transmitted from the camera for examining the timing of the arrival of the first reply signal to said second terminal to determine whether or not the examined timing falls into a predetermined condition for controlling the operation of said means for producing, said examining means is further responsive to a second reply signal at said second terminal transmitted from the camera subsequent to the first reply signal, and includes first means for measuring a first period between the arrival of the first and second reply signals, and the predetermined condition is that the measured first period is longer than a first predetermined timer period; and
   means responsive to said examining means for interrupting said producing means from producing the release signal when the examined timing falls into the predetermined condition.

3. Interval timer as claimed in claim 2 further comprising means for controlling the transmission of the release signal to the camera to allow the transmission of a subsequent release signal as produced by said producing means when the time of the arrival of the second reply signal and the time of the production of the next release signal are in a first predetermined relationship, and to postpone the transmission of the next release signal until a time depending on the arrival of the second reply signal when the time of the arrival of the second reply signal and the time of the production of the next release signal are in a second predetermined relationship opposite to the first predetermined relationship.

4. Interval timer as claimed in claim 2, wherein said examining means includes a delay circuit, responsive to the arrival of the first reply signal, to change the output thereof with a predetermined delay, and further including means for signaling when the change in the output of said delay circuit is prior to the arrival of the second reply signal, said interrupting means being responsive to said signaling means.

5. Interval timer as claimed in claim 2, wherein said examining means further includes second means for measuring a second period from the transmission of the release signal to the arrival of the first reply signal, and further including means for interrupting said producing means from producing the release signal when the measured second period is longer than a second predetermined time period.

6. Interval timer as claimed in claim 2, wherein the arrival of the first and second reply signals are synchronized with a substantial termination of the exposure and with a substantial completion of the film winding in the camera, respectively.

7. Interval timer as claimed in claim 2, further comprising means for providing a warning signal in response to the operation of said examining means.

* * * * *

UNITED STATES PATENT AND TRADEMARK OFFICE
CERTIFICATE OF CORRECTION

PATENT NO. : 4,392,733
DATED : July 12, 1983
INVENTOR(S) : Beppu et al

It is certified that error appears in the above-identified patent and that said Letters Patent is hereby corrected as shown below:

On the title page
[30]    Foreign Application Priority Data should read

July 8, 1980 [JP]   Japan .......... 55-93752

July 8, 1980 [JP]   Japan .......... 55-93753

Signed and Sealed this

Eighteenth Day of October 1983

[SEAL]

*Attest:*

GERALD J. MOSSINGHOFF

*Attesting Officer*     *Commissioner of Patents and Trademarks*